United States Patent
Baumgartner et al.

(10) Patent No.: US 8,596,942 B2
(45) Date of Patent: Dec. 3, 2013

(54) SCREW HAVING A SEALING WASHER ASSEMBLY

(75) Inventors: Michael Baumgartner, Montlingen (CH); Markus Kieber, Schaanwald (LI); Sven Matthiesen, Lindau (DE); Mirko Meboldt, Oftersheim (DE)

(73) Assignee: Hilti Aktiengesellschaft, Schaan (LI)

( * ) Notice: Subject to any disclaimer, the term of this patent is extended or adjusted under 35 U.S.C. 154(b) by 604 days.

(21) Appl. No.: 12/583,416

(22) Filed: Aug. 20, 2009

(65) Prior Publication Data

US 2010/0047033 A1 Feb. 25, 2010

(30) Foreign Application Priority Data

Aug. 21, 2008 (DE) .................. 10 2008 041 411

(51) Int. Cl.
*F16B 43/00* (2006.01)
*B65D 85/24* (2006.01)

(52) U.S. Cl.
USPC .................. 411/371.1; 411/442; 206/338

(58) Field of Classification Search
USPC ................ 411/533, 542, 371.1, 442, 443; 206/338, 345, 347
See application file for complete search history.

(56) References Cited

U.S. PATENT DOCUMENTS

| | | | |
|---|---|---|---|
| 316,619 A * | 4/1885 | Hayes | 411/378 |
| 2,643,904 A * | 6/1953 | Wehmanen | 411/542 |
| 2,761,347 A * | 9/1956 | McKee, Jr. | 411/371.1 |
| 2,927,495 A * | 3/1960 | Barwood | 411/371.1 |
| 3,153,971 A * | 10/1964 | Lovisek | 411/371.1 |
| 3,202,033 A * | 8/1965 | Weidner, Jr. | 411/371.1 |
| 3,298,270 A * | 1/1967 | Launay | 411/542 |
| 3,500,712 A | 3/1970 | Wagner | |
| 3,606,357 A * | 9/1971 | Yonkers | 411/537 |
| 4,930,630 A * | 6/1990 | Habermehl | 206/347 |
| 5,156,509 A * | 10/1992 | Wu | 411/369 |
| 5,542,323 A * | 8/1996 | Habermehl et al. | 81/434 |
| 6,811,366 B2 * | 11/2004 | Chen | 411/533 |
| 2003/0178334 A1* | 9/2003 | Pally et al. | 206/345 |
| 2003/0213712 A1* | 11/2003 | Shinjo | 206/346 |
| 2006/0186002 A1* | 8/2006 | Pally et al. | 206/345 |
| 2010/0051490 A1* | 3/2010 | Shinjo | 206/347 |

FOREIGN PATENT DOCUMENTS

| | | |
|---|---|---|
| DE | 2433875 | 2/1975 |
| DE | 19755953 | 7/1999 |
| GB | 1473355 | 5/1977 |
| JP | 05-148098 | 1/1995 |
| TW | 293 455 | 12/1996 |

\* cited by examiner

*Primary Examiner* — Flemming Saether
(74) *Attorney, Agent, or Firm* — Davidson, Davidson & Kappel, LLC

(57) ABSTRACT

A screw including a sealing washer assembly and a shank which defines a screw axis and has a thread in at least a portion thereof and whose one end is provided with a head. The sealing washer assembly is disposed on the shank and includes at least one sealing washer and a reinforcing washer, said reinforcing washer having a thickness, and the sealing washer assembly having a cumulative thickness is disclosed. The sealing washer assembly is spaced, along the screw axis, at a distance from an underside of the head facing the shank, said distance being greater than the thickness of the reinforcing washer and smaller than the cumulative thickness of the sealing washer assembly.

5 Claims, 1 Drawing Sheet

SCREW HAVING A SEALING WASHER ASSEMBLY

This claims priority to German Patent Application DE 10 2008 041 411.5, filed Aug. 21, 2008, the entire disclosure of which is hereby incorporated by reference herein.

The present invention relates to a screw having a sealing washer assembly and a shank which defines a screw axis and has a thread in at least a portion thereof, and whose one end is provided with a head; the sealing washer assembly being disposed on the shank and including at least one sealing washer and a reinforcing washer, said reinforcing washer having a thickness, and the sealing washer assembly having a cumulative thickness. Screws of this type may be in the form of self-tapping screws or self-drilling screws and are used, for example, for screwing together metal sheets, the screw joint being protected from ingress of liquid by a sealing washer assembly.

BACKGROUND OF THE INVENTION

In U.S. Pat. No. 3,500,712, there is disclosed a screw of this type having a head of hexagonal peripheral geometry as a torque-receiving means and a shank having a peripheral thread. The shank end facing the head has an unthreaded region onto which is fitted a washer assembly. The washer assembly includes a sealing washer made of an elastic material and a relatively rigid washer made, for example, of metal. The washer assembly is relatively close to, or directly contiguous to the underside of the screw head.

SUMMARY OF THE INVENTION

This screw has the disadvantage of not being suited for being magazined on a magazine having, for example, a receiving channel for screw heads.

It is an object of the present invention to overcome the above-mentioned disadvantages and to devise a screw that is capable of being readily magazined.

The present invention, provides spacing a sealing washer assembly, along the screw axis, at a distance from an underside of the head facing the shank, said distance being greater than the thickness of the reinforcing washer and smaller than the cumulative thickness of the sealing washer assembly. This enables the screw to be readily magazined on an elongated magazine that has a receiving channel and whose wall thickness corresponds to the thickness of the reinforcing washer at a maximum deviation of +/−20% therefrom. In the region of the opening of the magazine, the magazine walls extend into the space between the head and the sealing washer assembly of the screw so as to hold the screw on the magazine.

The end of the shank facing the head may be advantageously provided with a cylindrical collar whose end facing away from the head has a reinforcing washer fitted thereon and whose length along the screw axis corresponds to the distance plus the thickness of the reinforcing washer. Thus, the distance between the underside of the head and the sealing washer assembly is determined by the collar, thereby allowing for easy assembly of the screw together with the sealing washer assembly. In addition, the provision of a collar is beneficial from a production engineering standpoint.

It is also advantageous if, in the region of the collar, the shank has a first diameter which is greater than a second diameter of the shank in the region of the thread. This enables the collar to serve as a stop when the screw is driven into a substrate, thereby preventing the sealing washer from being damaged or squeezed out in the process.

BRIEF DESCRIPTION OF THE DRAWINGS

The present invention is described with reference to an exemplary embodiment illustrated in the drawing, in which.

DETAILED DESCRIPTION

Figure 1:
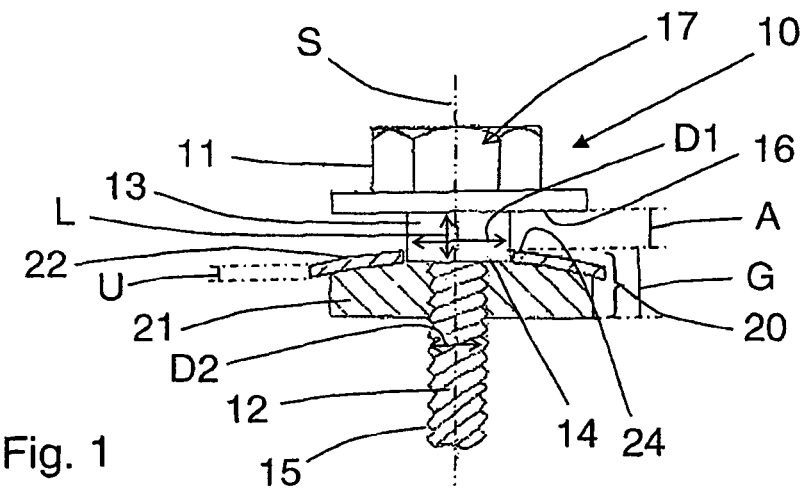
FIG. 1 is a side view of an inventive screw having a sealing washer assembly.
Figure 2:
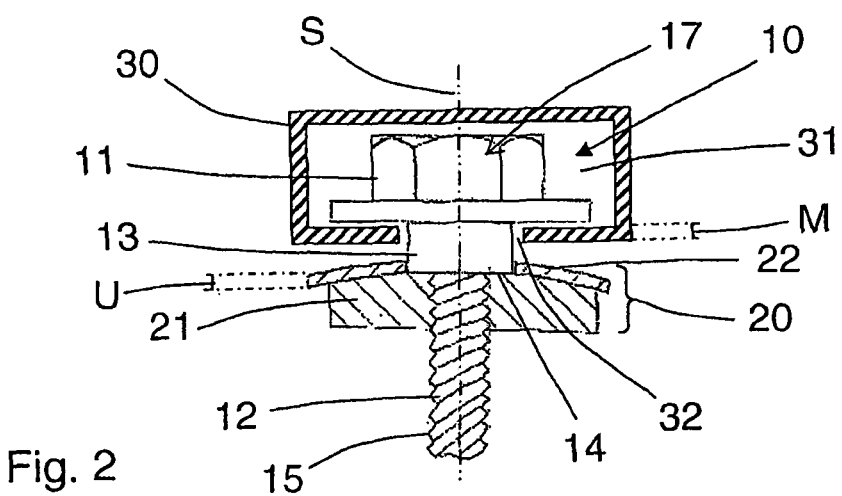
FIG. 2 is a view showing the inventive screw and sealing washer assembly of FIG. 1 on a magazine strip.

The inventive screw 10 and its sealing washer assembly 20 shown in FIGS. 1 and 2 has a shank 12, a portion of which is provided with a thread 15, and whose one end has a tip (not shown in the figures), while its other, opposite end is provided with a head 11. The tip may be designed as a drilling tip or as a pointed tip. Screw axis S defines an axial direction of screw 10. Head 11 features a torque-receiving means 17 for a screw tool, which has an exterior polygonal portion, in particular an exterior hexagonal portion, adapted to be engaged by a wrench.

The end of shank 12 facing head 11 is provided with a cylindrical collar 13. The axial end of collar 13 facing away from head 11 has a stop surface 14. In the region of collar 13, shank 12 has a first diameter D1 which is greater than a second diameter D2 of shank 12 in the region of thread 15 (see in particular FIG. 1).

Sealing washer assembly 20 includes a sealing washer 21 and, contiguous therewith, a reinforcing washer 22 made of a rigid material such as metal, in particular steel. Reinforcing washer 22 has a thickness U, and sealing washer assembly 20 has a cumulative thickness G (see in particular FIG. 1). Sealing washer assembly 20 is spaced from head 11 along screw axis S such that there is a distance A between an upper side 24 of reinforcing washer 22 of said sealing washer assembly and an underside 16 of said head facing shank 12. Distance A is greater than thickness U of reinforcing washer 22 and smaller than cumulative thickness G of sealing washer assembly 20 (see in particular FIG. 1). When screw 10 is in its initial position, reinforcing washer 22 is disposed on the end of collar 13 facing away from head 11, while sealing washer 21 abuts stop surface 14 of collar 13. To this end, second diameter D2 of shank 12 in the region of collar 13 is slightly smaller than the diameter of the opening of reinforcing washer 22. A length L of collar 13 along screw axis S corresponds to distance A plus thickness U of reinforcing washer 22.

In FIG. 2, screw 10 is placed on a magazine 30 having a receiving channel 31 for the heads 11 of a plurality of screws 10 and a slotted opening 32 for the shanks 12 of screws 10. Furthermore, magazine 30 has, at least in the region adjacent to slotted opening 32, a wall thickness M which is smaller than distance A between underside 16 of head 11 and sealing washer assembly 20. Wall thickness M preferably corresponds to thickness U of reinforcing washer 22 at a maximum deviation of +/−20% therefrom. Distance A between sealing washer assembly 20 and underside 16 of head 11 facing shank 12 allows screw 10 to be guided with ease of motion on magazine 30; even given a screw axis S that is slightly oblique relative to the longitudinal axis of magazine 30, it is still movable within receiving channel 31.

Figure 3:
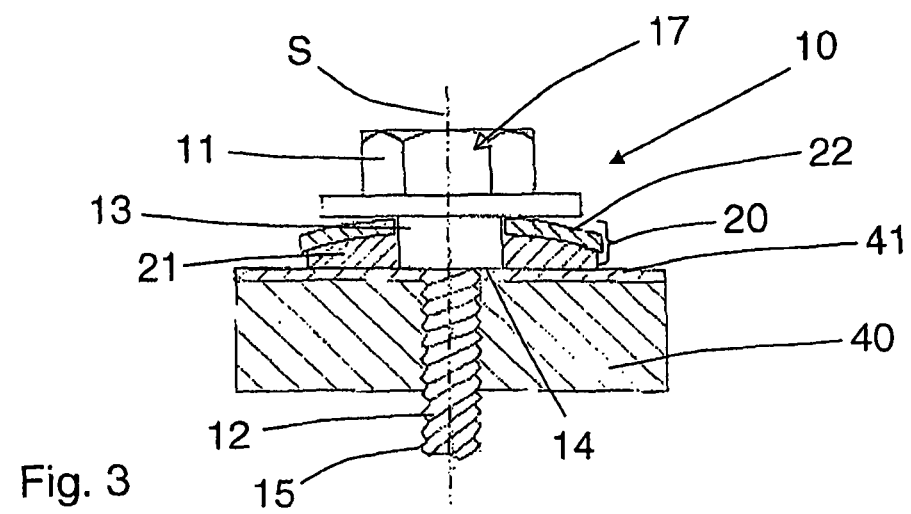
FIG. 3 is a view showing the screw and sealing washer assembly of the present invention screwed into a workpiece.

FIG. 3 shows screw 10 screwed into a workpiece 40, with a flat member 41, such as a sheet of metal, having been fixed thereto. During the process of screwing screw 10 into workpiece 40, distance A between underside 16 of head 11 and sealing washer assembly 20 was reduced to zero, and sealing washer assembly 20 was slipped completely onto collar 13. In this condition, sealing washer 21 abuts sealingly on flat member 41.

What is claimed is:

1. A screw comprising:
    a sealing washer assembly;
    a shank defining a screw axis and having a thread in at least a portion thereof and having a first end; and
    a head at the first end and having an underside facing the shank;
    the sealing washer assembly being disposed on the shank and including at least one sealing washer and a reinforcing washer, the reinforcing washer having a thickness, and the sealing washer assembly having a cumulative thickness,
the sealing washer assembly being spaced, along the screw axis, at a distance from the underside, the distance being greater than the thickness of the reinforcing washer and smaller than the cumulative thickness of the sealing washer assembly;
    wherein the first end of the shank is provided with a cylindrical collar whose end facing away from the head has the reinforcing washer fitted thereon, the collar having a length along the screw axis corresponding to the distance plus the thickness of the reinforcing washer;
    wherein in the region of the collar, the shank has a first diameter which is greater than a second diameter of the shank in the region of the thread.

2. A magazine for a fastening tool, comprising
    a receiving channel having a wall, the wall having a wall thickness,
    a screw comprising a sealing washer assembly and a shank defining a screw axis and having a thread in at least a portion thereof, the shank having a first end provided with a head; the sealing washer assembly being disposed on the shank and including at least one sealing washer and a reinforcing washer, the reinforcing washer having a thickness, and the sealing washer assembly having a cumulative thickness,
    the sealing washer assembly being spaced, along the screw axis, at a distance from an underside of the head facing the shank, the distance being greater than the wall thickness, the head being received in the receiving channel, and the wall engaging between the underside of the head facing the shank and the reinforcing washer; and
    wherein the first end of the shank is provided with a cylindrical collar whose end facing away from the head has the reinforcing washer fitted thereon and whose length along the screw axis corresponds to the distance plus the thickness of the reinforcing washer;
    wherein in the region of the collar, the shank has a first diameter greater than a second diameter of the shank in the region of the thread.

3. The magazine as recited in claim 2 wherein the distance is greater than the thickness of the reinforcing washer.

4. The magazine as recited in claim 3 wherein the distance is smaller than the cumulative thickness of the sealing washer assembly.

5. The magazine as recited in claim 2 wherein the distance is smaller than the cumulative thickness of the sealing washer assembly.

* * * * *